United States Patent [19]
Hobbs

[11] Patent Number: 5,195,797
[45] Date of Patent: Mar. 23, 1993

[54] GOLF CART WINDSHIELD ASSEMBLY
[75] Inventor: L. T. Hobbs, Raleigh, N.C.
[73] Assignee: US Supply Company, Raleigh, N.C.
[21] Appl. No.: 850,498
[22] Filed: Mar. 13, 1992
[51] Int. Cl.$^5$ ............................................. B60J 1/04
[52] U.S. Cl. .................................. 296/77.1; 296/87; 280/DIG. 5
[58] Field of Search ............... 296/77.1, 86, 87, 96.21; 280/DIG. 5

[56] References Cited
U.S. PATENT DOCUMENTS

| | | | |
|---|---|---|---|
| 4,773,695 | 9/1988 | Jones et al. | 296/77.1 |
| 4,819,979 | 4/1989 | Moglia | 296/77.1 |
| 4,950,017 | 8/1990 | Norton | 296/77.1 |
| 5,110,174 | 5/1992 | Andree | 296/77.1 |

Primary Examiner—Robert R. Song
Attorney, Agent, or Firm—Rhodes, Coats & Bennett

[57] ABSTRACT

The present invention relates to a golf cart windshield assembly that comprises two windshield panels with one windshield panel being movable from a closed position to an open position. Secured to the movable windshield panel is a pair of plastic-like resilient post clamps that clamp and secure the movable windshield panel to a pair of laterally spaced front support posts forming a part of a conventional golf cart. Secured to the other windshield panel is a resilient plastic-like holding clip that is designed to receive and retain a bent edge portion of the movable windshield panel when the movable windshield panel is in the open position.

5 Claims, 3 Drawing Sheets

GOLF CART WINDSHIELD ASSEMBLY

FIELD OF THE INVENTION

The present invention relates to golf cart windshield assemblies and more particularly to a two panel golf cart windshield assembly wherein one panel is movable from a closed position to an open position.

BACKGROUND OF THE INVENTION

Golf carts are typically provided with a windshield structure or assembly that is particularly useful to protect the occupants of the golf cart in the case of rain, strong wind or other foul weather. Most golf cart windshield assemblies are designed so that the front or windshield area of the golf cart can be open when the weather is pleasant. Typically, these windshield assemblies have included two panels, one a stationary panel secured about the lower front portion of the windshield area of a golf cart and a movable windshield panel secured above the stationary windshield panel. It has been known to mount the upper windshield panel such that it can be rotated or moved downwardly adjacent the lower windshield panel so as to give rise to an upper open windshield area across the front of the golf cart. But there has been a major problem with these windshield assemblies. That problem is that it is very difficult to secure the windshield panels to a golf cart because vibration and other forces acting on the golf cart directly and on the windshield panels indirectly cause the securing means to become broken or weakened and to be ineffective in securing the windshield panels to the golf cart frame structure. This is particularly true in cases where the securing means is associated with a fold down or movable windshield panel. Here the problem is even more pronounced because the securing means has to be designed so that it can be conveniently opened and closed to permit the windshield to be secured and detached from the frame structure of the golf cart. In these cases it is difficult to design a heavy-duty rigid securing structure for securing the movable windshield panel to the golf cart's frame structure and at the same time provide a securing structure that can be easily and conveniently manipulated to allow for convenient attachment and detachment.

Another problem that is significant in golf cart windshield assemblies is the problem dealing with securing the movable windshield adjacent the stationary windshield when the movable windshield is in the open position. Often it has been difficult to secure the movable windshield in the open position in such a way that the movable windshield will not scratch and bang against the stationary windshield when the movable windshield is in the open position.

Therefore, there is a need for a golf cart windshield assembly that provides a very sound and rigid securement structure for the various windshield panels and which permits the movable windshield to be tightly secured to the golf cart's frame structure when in a closed position and to be securely held adjacent the stationary windshield when the movable windshield is in the open position.

SUMMARY AND OBJECTS OF THE INVENTION

The present invention entails a golf cart windshield assembly that is designed to overcome the disadvantages and drawbacks of conventional golf cart windshield assemblies. In particular, the present invention entails a golf cart windshield assembly having an upper fold down windshield panel that is provided with a pair of plastic-like post clamps secured about opposite edges of the windshield panel, with each post clamp being designed to snap around and secure around a vertical post forming a part of the golf cart's frame structure. A holding resilient clip is secured to the outer face of a lower stationary windshield panel while the upper edge of the upper fold down windshield panel is bent outwardly at a right angle and designed such that the upper bent portion of the fold down windshield panel is designed to fit into and be held within the holding clip secured on the outer surface of the stationary panel.

It is therefore an object of the present invention to provide an improved golf cart windshield assembly over conventional known golf cart windshield assemblies.

Another object of the present invention resides in the provision of a fold down golf cart windshield assembly including at least one movable windshield panel that includes means for tightly securing the windshield panel in a closed position about the frame structure of the golf cart and also effective to tightly secure the fold down or movable windshield panel to an adjacent stationary panel when the fold down windshield panel is in the open position.

Still a further object of the preset invention resides in the provision of at least two plastic-like resilient c-clamps secured to opposite edges of a fold down upper windshield panel and wherein the post clamps are operative to tightly secure the fold down or movable windshield panel to the frame structure of the golf cart when the same windshield is in the closed position.

Still a further object of the present invention resides in the provision of a fold down golf cart windshield assembly that is durable, strong and which will withstand the forces and vibrations associated with a golf cart as the cart moves over a golf course.

Other objects and advantages of the present invention will become apparent and obvious from a study of the following description and the accompanying drawings which are merely illustrative of such invention.

DETAILED DESCRIPTION OF THE INVENTION

Figure 1:
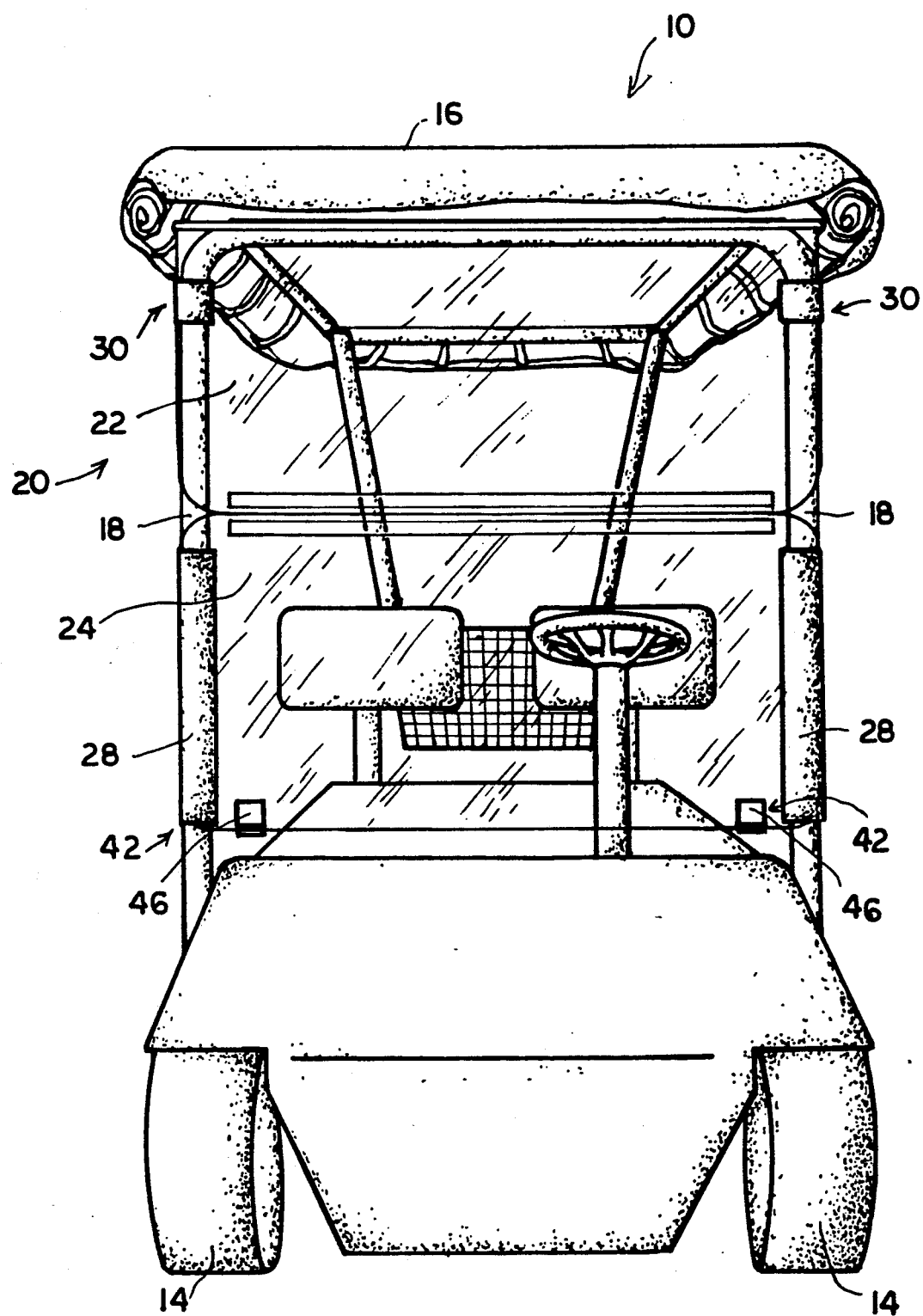
FIG. 1 is a front elevational view of a golf cart incorporating the golf cart windshield assembly of the present invention.

With further reference to the drawings, the golf cart windshield assembly of the present invention is shown therein and indicated generally by the numeral 20. Windshield assembly 20 is mounted on a conventional golf cart indicated generally by the numeral 10. Before reviewing the structure of the windshield assembly 20 in detail, it will be beneficial to basically review the structure of the golf cart 10. In that regard, golf cart 10 includes a frame structure 12 supported by a series ground engaging wheels 14. Extending upwardly from both the front and rear portions of the frame structure 12 is a series of vertical support posts 18 that support a top 16.

Windshield assembly 20 is mounted to the front vertical post 18. As noted in the drawings, the windshield assembly 20 includes an upper windshield panel 22 and a lower windshield panel 24. Upper windshield panel 22 is a fold down or movable windshield while the lower windshield panel 24 is stationary. To accommodate this fold down movement of upper windshield panel 22, the windshields are joined together by a pivot coupler 26.

To secure the lower windshield 24 between vertical front posts 18 there is provided a pair of sleeves 28. Sleeves 28 are secured in conventional fashion to the lower windshield panel 24 and to the respective vertical support posts 18. Suffice it to say that sleeves 28 wrap around and engage at least three sides of the vertical posts 18 and are secured thereto by glue, bolts, friction molding tape or other suitable means.

Figure 5:
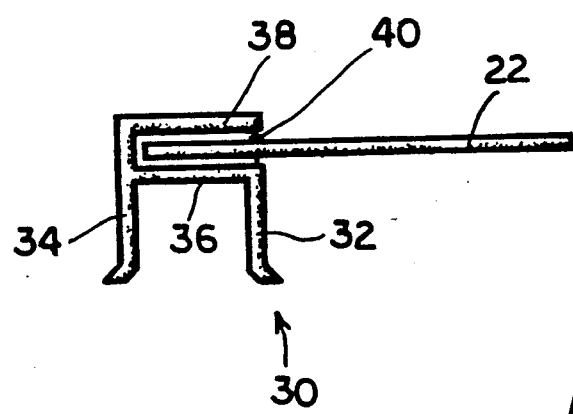
FIG. 5 is a top plan view showing the post clamp secured to the edge of the upper fold down windshield panel.

Turning to the upper windshield panel 22 it is seen that about the upper outside edges of this panel there is provided a post clamp indicated generally by the numeral 30. As will be appreciated, the post clamps 30 function to secure the upper windshield panel 22 in a closed position to the respective front vertical posts 18. As seen in FIG. 5, each post clamp 30 includes a pair of resilient arms 32 and 34 that extend from a base 36. Arms 32 and 34 along with the base form a u-shaped structure. Spaced from the base is a back 38 that defines a slot between the back and the base 36 for receiving the upper windshield panel 22. To form a frictional fit or a secure fit between the windshield panel 22 and the slot formed in the post clamp 30, it is advantageous to provide a strip of body molding tape 40 between the windshield panel 22 and the slot formed by back 38 and base 36. In the present disclosure, the post clamps 30 are constructed of a plastic material but the individual arms 32 and 34 are designed to flex back and forth such that the arms can be snapped into place around a respective vertical post 18. It is important that the respective post clamps 30 be able to slip onto and off from the respective vertical posts in a convenient manner.

Figure 4:
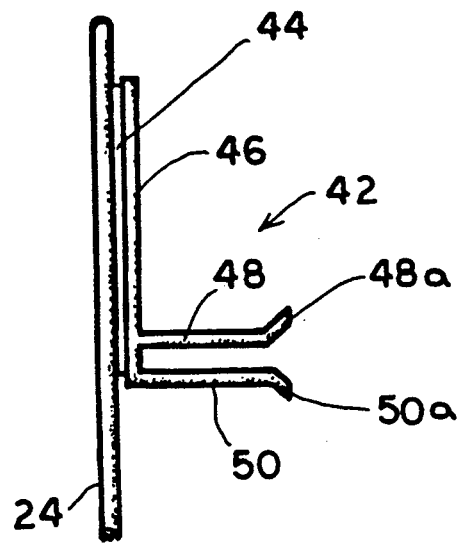
FIG. 4 is a fragmentary side elevational view showing the holding clip mounted to the outer face of the lower stationary windshield panel.

Secured about opposite sides on the outer face of the lower windshield panel 24 is a pair of windshield panel holding clips, each indicated generally by the numeral 42. Viewing FIG. 4, it is seen that each holding clip 42 is mounted to the windshield panel 24 by a body molding tape strip indicated by numeral 44. This essentially glues and secures the holding clip 42 onto the lower windshield panel 24. Forming a part of each holding clip 42 is a base 46 and a pair of resilient fingers 48 and 50 which extend from the base. It is appreciated that the resilient fingers 48 and 50 are slightly spaced apart to form a windshield opening therebetween. Note also that the outer ends of the respective resilient fingers 48 and 50 are slightly flared outwardly to facilitate insertion into the slot defined between the resilient fingers 48 and 50.

Figures 2, 3:
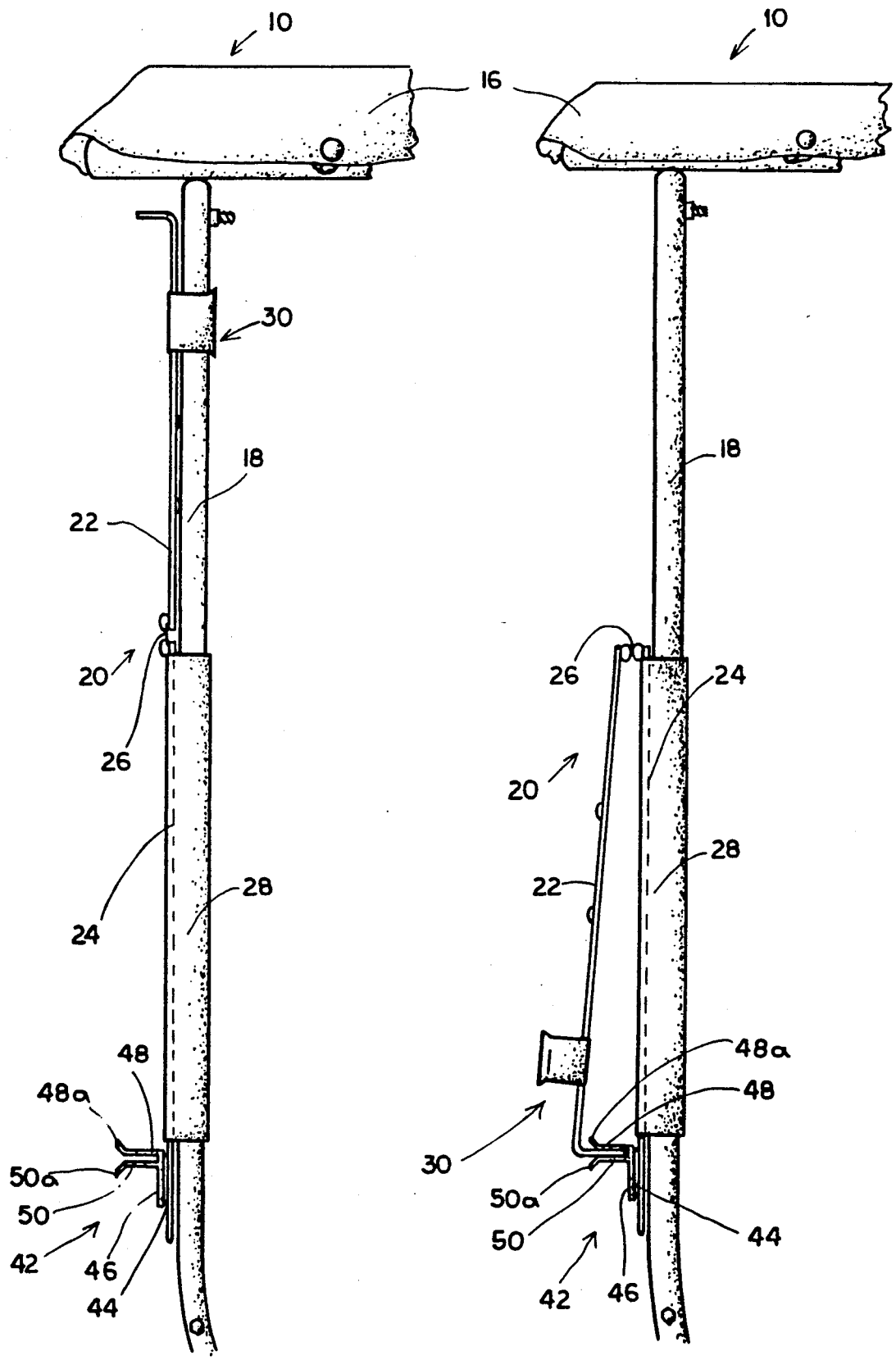
FIG. 2 is a fragmentary side elevational view of the golf cart windshield assembly shown in the closed position.
FIG. 3 is a fragmentary side elevational view of the golf cart windshield assembly shown in the open position.

As seen in FIG. 2, the upper edge 22a of upper panel 22 is turned at a 90° angle. This turned edge 22a of the upper windshield panel 22 serves to fit within the slot formed between the resilient fingers 48 and 50 and in fact to tightly fit therebetween so as to secure the upper windshield panel 22 in the open position adjacent the lower windshield panel 24 as viewed in FIG. 3.

Therefore, it is appreciated that the windshield assembly 20 of the present invention functions to provide a windshield assembly that is sturdy and rigid and which is provided with a fold down or movable upper windshield panel that can be securely stationed in either a closed position or an open position.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A two-piece fold down golf cart windshield assembly for mounting on a golf cart having a pair of laterally spaced upstanding front support posts, the golf cart windshield assembly comprising:
   a) a first fixed lower windshield panel secured between the upstanding front posts and including a top edge portion;
   b) a second movable upper windshield panel secured adjacent the top edge portion of the first windshield panel and movable between a closed position where the second windshield panel extends generally co-planar with the first windshield panel and an open position where the second windshield panel lies generally back-to-back with the first windshield panel; and
   c) means for securing the second windshield panel to the support posts when the same assumes the closed position and for securing the second windshield panel to the first windshield panel when the second windshield panel assumes the open position, said securing means including:
      1) a pair of resilient post clamps secured to opposite edges of the second windshield panel, each post clamp being of a generally u-shape and having a pair of resilient arms that extend around and frictionally engage a portion of each support post to hold the second windshield panel in the closed position, the resilient arms of each clamp being movable slightly inwardly and outwardly such that the clamps can be easily pushed onto and removed from respective support posts;
      2) at least one holding clip mounted to the first windshield panel; and
      3) means associated with said second windshield panel for mating with the holding clip associated with the first windshield panel and securing the second windshield panel in the open position where it lies generally back-to-back with the first windshield panel.

2. The golf cart windshield assembly of claim 1 wherein the means associated with said second windshield panel for mating with the holding clip includes a turned edge formed along the top edge of the second windshield panel when the same assumes the closed position.

3. The golf cart windshield assembly of claim 1 wherein the first windshield panel includes an outer surface and the holding clip is mounted on the outer surface and includes a pair of resilient fingers adapted to receive and retain the means associated with the second windshield panel which is adapted to mate with the holding clip.

4. The golf cart windshield assembly of claim 1 wherein there is provided body molding tape interposed between the second windshield panel and the respective post clamps for securing the post clamps to the second windshield panel.

5. A golf cart windshield assembly for mounting on a golf cart having a pair of laterally spaced upstanding front support posts comprising: a first fixed lower windshield panel secured between the upstanding front posts and including a top edge portion; a second movable upper windshield panel secured adjacent the top edge portion of the first windshield panel and movable between a closed position where the second windshield panel extends generally co-planar with the first windshield panel and an open position where the second windshield panel lies generally back-go-back to the first windshield panel; and means for securing the second windshield panel to the support posts and for permitting the second windshield panel to move from the closed position to the open position; the securing means including a pair of resilient c-shaped post clamps secured to opposite edges of the second windshield panel, each c-shaped post clamp having a pair of resilient arms that extend around and frictionally engage a portion of each support post to hold the second windshield panel in the closed position, the resilient arms of each c-shaped post clamp being movable slightly inwardly and outwardly such that the clamps can be easily pushed onto and removed from respective support posts; and fastening means for securing each c-shaped post clamp to the second windshield panel.

* * * * *